Patented Apr. 19, 1927.

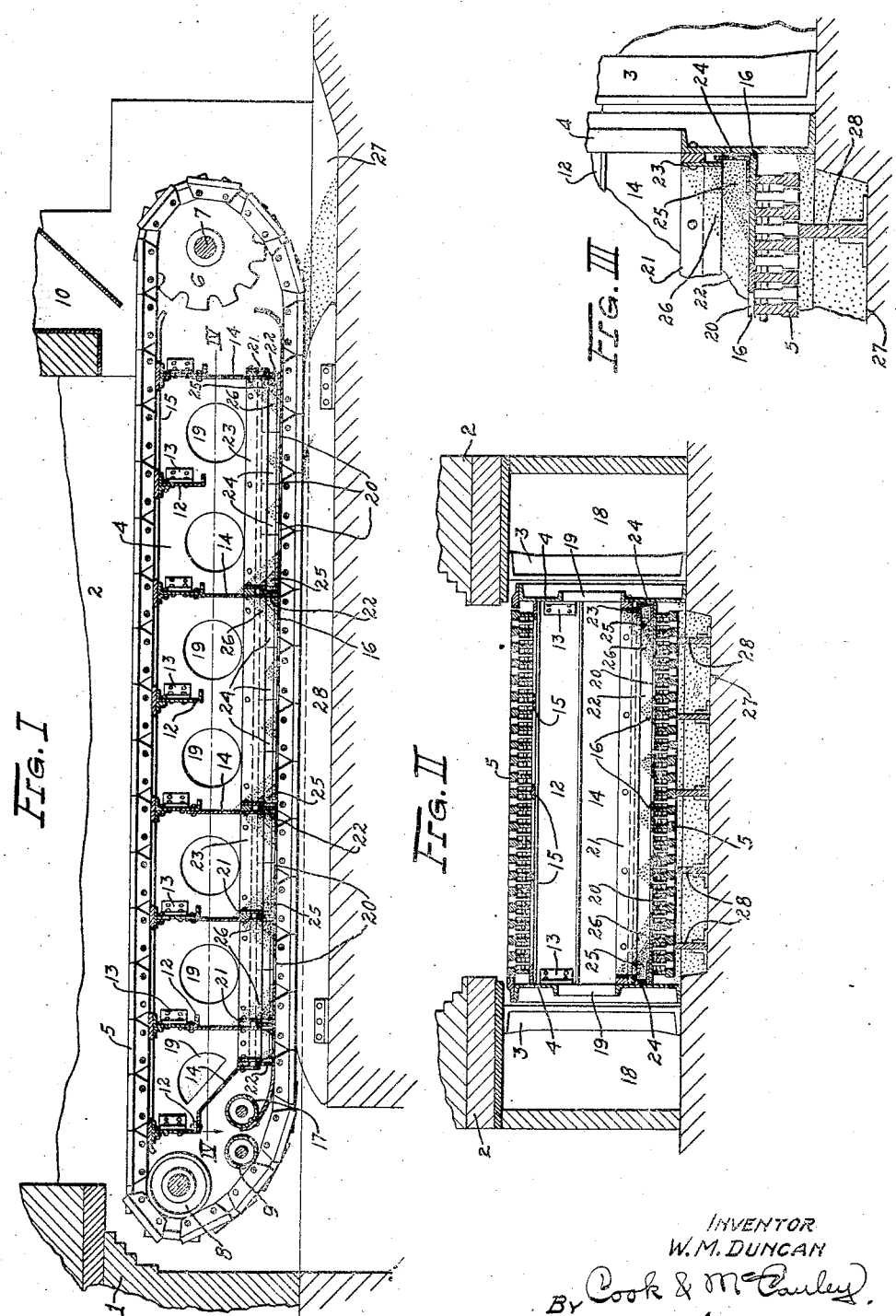

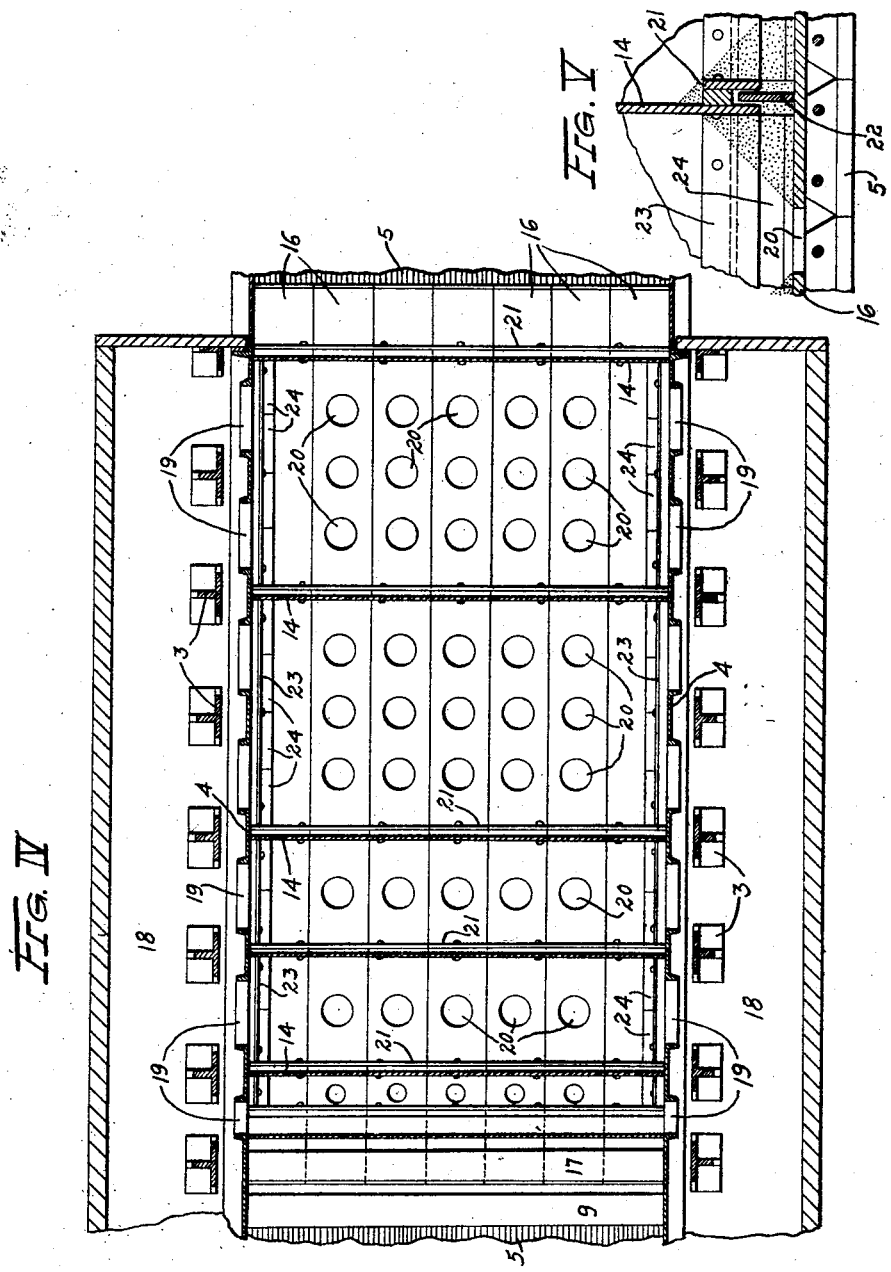

1,625,078

UNITED STATES PATENT OFFICE.

WILLIAM M. DUNCAN, OF ALTON, ILLINOIS.

MECHANICAL STOKER.

Application filed November 12, 1923. Serial No. 674,196.

This invention relates to improvements in mechanical stokers, and more particularly to a stoker provided with one or more draft boxes from which draft is discharged through the upper portion of an endless traveling grate. The object of the invention is to produce a simple and inexpensive means for sealing the draft boxes to prevent leakage of the draft passing to the fuel. This is especially desirable in a stoker designed for a forced draft, and my object is to provide an inexpensive draft box structure with effective sealing means at the junctions of the walls of the draft box.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Briefly stated, the preferred form of the invention comprises a draft box surrounded by an endless traveling grate, the bottom wall of the box being seated on and supported by the lower portion of the traveling grate. The grate structure comprises numerous endless rows of links, usually made of inaccurate castings loosely pivoted to each other, so the faces of the grate are rather irregular, and the bottom wall of the box rests upon the irregular inner face of the traveling grate. One of the novel features of the present invention lies in the flexibility of this bottom wall. It is preferably made of independently yieldable sections contacting with and supported by the lower portion of the traveling grate. The relatively small sections are preferably arranged longitudinally of the grate, with their side edges adjacent to each other, and they may be long enough to form the bottom walls of several draft boxes arranged transversely of the grate.

Another novel feature lies in the seal preventing leakage between the bottom and side walls of the boxes. This sealing means preferably includes a loose bar resting upon the bottom wall and lapping the side wall of the draft box, and while this yieldable sealing bar can be advantageously used with the flexible bottom wall just referred to, it is not limited to such use, for it may be loosely supported by any bottom wall member, and especially any bottom wall member which rests upon the irregular grate links.

The apparatus herein shown includes a series of draft boxes having side walls arranged transversely of the grate and end walls at the side edges of the grate, and the seals are located at the lower corners of the draft box to prevent leakage between the bottom wall and the lower edges of the side and end walls. The ashes and fine particles of fuel dropping through the upper portion of the grate are permitted to accumulate at these corners, so as to cooperate with the sealing bars in preventing leakage of the draft. However, the bottom wall may be provided with an outlet through which excess ashes are discharged to the lower portion of the traveling grate and thus carried away from the draft boxes.

Although the ashes are adapted for use as sealing material, they are sometimes in the form of a fine powder which is liable to be blown through the spaces to be sealed, and I have herein disclosed other sealing material which forms a more effective seal. According to this feature of the invention, granular material heavier than ashes is located in the corners at the junctions of the side and bottom walls of a draft box. This heavy granular material may be cast iron borings, or other fine material heavier than the mixture of coal and ashes which accumulates in the draft box. The heavy sealing material will not be disturbed by the air pressure in the draft box, and it may be used in various types of draft boxes differing from the general structure herein shown.

Fig. I is a longitudinal section illustrating a mechanical stoker embodying the features of this invention.

Fig. II is a transverse section of the structure shown in Fig. I.

Fig. III is an enlarged section showing a seal at one end of a draft box.

Fig. IV is a horizontal section taken approximately on the line IV—IV in Fig. I.

Fig. V is an enlarged section showing a seal preventing leakage from one draft box to another.

To illustrate the invention I have shown a portion of a furnace provided with a wall 1 at the rear of the stoker, and walls 2 at opposite sides of the stoker. Upright supporting beams 3 are located below the walls 2.

The stoker comprises side frames 4, an endless chain grate 5 between the side frames, the usual drive wheels 6 mounted on a power shaft 7 at the front of the grate, and idle rolls 8 and 9 at the rear of the grate. The shaft 7 can be driven by any suitable means to cause the upper portion of the grate to travel toward the rear of the furnace while the lower portion moves toward the front. 10 designates a fuel hopper located at the front of the stoker to discharge fuel onto the top of the traveling grate.

Beams 12 are arranged transversely of the grate and connected by means of angle bars 13 to the side frames 4, and plates 14 extend downwardly from some of these beams. The plates 14 and the beams to which they are secured form the side walls of draft boxes which are surrounded by the grate. The end walls of these draft boxes are formed by the side frames 4 at opposite sides of the grate. Each draft box is open at the top to discharge the draft into the fuel-supporting portion of the grate, and this portion travels on long bars 15 (Figs. I and II) resting upon the beams 12.

The bottom walls of the several draft boxes are formed by a series of long closure plates 16 arranged longitudinally of the grate with their side edges adjacent to each other, as shown most clearly by Fig. IV, so as to form a continuous flexible bottom wall for the several draft boxes. These plates 16 are in contact with and supported by the lower portion of the traveling grate, and they are free to yield independently to each other to permit relatively free motion of the irregular grate links which frictionally engage said plates. To prevent longitudinal motion of the closure plates 16, their rear ends may be extended partly around and secured to a cylinder 17, as shown in Figs. I and IV. The roller 9 is located adjacent to the cylinder 17 to prevent the grate links from following the curvature of the end portions of the plates 16. At this point, the grate links are turned on their pivots, and excessive friction is avoided by contact with the roller 9.

A forced draft of air under pressure may be supplied through conductors 18 (Figs. II and IV) at opposite sides of the stoker, each side frame being provided with openings 19 for the admission of air to the draft boxes.

Ashes and fine particles of fuel drop through the upper portion of the endless grate and fall onto the long plates 16 which form the bottoms of the draft boxes. Some of these plates have outlet openings 20 through which ashes are discharged into the lower portion of the traveling grate. In actual practice ashes accumulate in angular piles, as suggested by the drawing, each pile being inclined toward a discharge opening 20.

I will now point out the manner in which the draft boxes may be sealed to prevent leakage of draft at their lower corners. The wall members 14 terminate above the bottom of the draft boxes, and to provide recesses at the lower edges of said wall members 14, bars 21 are secured to and spaced from their lower edges, as shown most clearly by Figs. IV and V. Sealing bars 22 are arranged transversely of the grate and loosely supported on the closure plates 16 which form the bottom of the draft boxes, the upper margins of said bars being located in the recesses at the lower margins of plates 14. The sealing bars 22 are thus loosely supported by the bottom wall and loosely interlocked with the side walls of the boxes, so it is not necessary to accurately assemble the sealing bars, and they are maintained by gravity in the desired sealing positions. The flexible bottom wall is in frictional contact with the chain grate, and the sealing bars yield in response to the irregular motion of the bottom wall, such motion being due to irregularities in the traveling grate structure. It is to be observed that the sealing bars 22 provide seals between the side and bottom walls of the draft boxes, and that these bars are not in frictional contact with the grate.

The end walls of the draft boxes are formed by the side frames 4 at the side edges of the traveling grate, but the flexible bottom wall cannot be closely fitted to these side frames. To prevent leakage between the bottom wall and side frames, bars 23 are secured to and separated from the respective side frames, as shown most clearly by Fig. III, thereby forming recesses to receive the upper margins of angle bars 24 which lie at the corners formed by the bottom wall and the side frames. Instead of using a long, rigid angle bar, the bars 24 are formed in short sections (Figs. I and IV) with their ends adjacent to each other to form a continuous flexible seal, and each section is loosely supported by the bottom wall and loosely interlocked with the side frames. Since these bars are L-shaped they conform to the corners to be sealed and their lower portions are not liable to drop between a side edge of the bottom wall and the adjacent side frame.

The ashes and fine fuel accumulating in the corners of the draft boxes can be used to prevent leakage of draft around the sealing bars 22 and 24. Fig. V shows ashes forming a seal to prevent leakage of draft past a sealing bar 22. However, a better seal can be produced by a relatively heavy foreign material, such as cast iron borings, or other granular material heavier than the mixture of ashes and fine fuel. The heavy granular material will firmly resist the air pressure tending to blow it through the spaces to be sealed, and after it is placed in the corners of the draft boxes it will not be disturbed by the usual service conditions.

Figs. I, II and III show seals formed by heavy granular material 25 located in the lower corners of the draft boxes and covered by inclined layers of ashes 26. Additional ashes falling onto the inclined faces of the seals will pass out through the discharge openings 20, so it is not necessary to disturb the seals during the removal of ashes from the draft boxes.

The ashes passing from discharge openings 20 enter the lower portion of the grate and drop into the cavity 27 below the same. It is desirable to fill this cavity with ashes, as suggested by Figs. I, II and III, so as to form a seal preventing leakage of draft through the discharge openings 20. Long bars 28 may be arranged in this ash-receiving cavity to support the lower portion of the grate.

I claim:

1. A mechanical stoker comprising an endless traveling chain grate, a draft box surrounded by said grate, the top of said draft box being open to discharge draft through the upper portion of the grate, said draft box having side and bottom walls to confine the draft, and the bottom wall being made of independently yieldable sections contacting with and supported by the lower portion of the traveling grate.

2. A mechanical stoker comprising an endless traveling chain grate, a draft box surrounded by said grate, the top of said draft box being open to discharge draft through the upper portion of the grate, said draft box having side and bottom walls to confine the draft, the bottom wall being made of independently yieldable sections arranged longitudinally of the grate and extending from one side wall to another, and said sections being in contact with and supported by the lower portion of the grate.

3. A mechanical stoker comprising an endless traveling chain grate, a draft box surrounded by said grate, the top of said draft box being open to discharge draft through the upper portion of the grate, said draft box having side and bottom walls to confine the draft, the bottom wall being made of independently yieldable sections contacting with and supported by the lower portion of the traveling grate, and one of said sections being provided with an outlet for the discharge of ashes into the lower portion of the grate.

4. A mechanical stoker comprising an endless traveling chain grate, draft boxes surrounded by said grate, the top of each draft box being open to discharge draft through the upper portion of the grate, and the draft boxes being provided with a bottom wall comprising independently yieldable sections arranged longitudinally of the grate and extending under the side walls of the draft boxes to form continuous closures for the bottoms of the draft boxes, and said independently yieldable sections being in contact with and supported by the lower portion of the traveling grate.

5. A mechanical stoker comprising an endless traveling chain grate, and draft boxes surrounded by said grate, said draft box comprising side wall members, and a series of independently yieldable closure plates resting upon and supported by the lower portion of the grate, said closure plates being arranged lengthwise of the grate with their side edges adjacent to each other, so as to form the bottom walls of the draft boxes.

6. A mechanical stoker comprising an endless traveling chain grate, a draft box surrounded by said grate, the top of said draft box being open to discharge draft through the upper portion of the grate, said draft box having side and bottom walls to confine the draft, the bottom wall being made of dependently yieldable sections contacting with and supported by the lower portion of the traveling grate, and seals to prevent leakage between the side walls of said draft box and the independently yieldable sections.

7. A mechanical stoker comprising an endless traveling chain grate, a draft box surrounded by said grate, the top of said draft box being open to discharge draft through the upper portion of the grate, said draft box having side and bottom walls to confine the draft, the bottom wall being made of independently yieldable sections contacting with and supported by the lower portion of the traveling grate, and granular material filling the lower corners of the draft box to prevent leakage between the bottom wall and the side walls.

8. A mechanical stoker comprising an endless traveling chain grate, a draft box surrounded by said grate, the top of said draft box being open to discharge draft through the upper portion of the grate, said draft box having side and bottom walls to confine the draft, the bottom wall being made of independently yieldable sections contacting with and supported by the lower portion of the traveling grate, and means to prevent free escape of ashes between the side walls of said draft box and said independently yieldable sections.

9. A mechanical stoker comprising an endless traveling chain grate, and a draft box surrounded by said grate, said draft box having side walls arranged transversely of the chain grate, end walls at the sides of said grate, a bottom wall comprising independently yieldable sections contacting with and supported by the lower portion of the traveling grate, and seals to prevent leakage between said end walls at the sides of the grate and the independently yieldable sections at the margins of the grate.

10. A mechnical stoker comprising an endless traveling chain grate, and a draft box surrounded by said grate, said draft box having side walls arranged transversely of the chain grate, end walls at the sides of said grate, a bottom wall comprising independently yieldable sections contacting with and supported by the lower portion of the traveling grate, and granular material filling the corners at the junctions of said bottom and end walls.

11. A mechanical stoker comprising an endless traveling chain grate, a draft box surrounded by said grate, the top of said draft box being open to discharge draft through the upper portion of the grate, said draft box having side and bottom walls to confine the draft, the bottom wall being in contact with and supported by the lower portion of the traveling grate, and sealing bars loosely mounted on said bottom wall, the upper edges of said sealing bars being movably mounted in lower margins of said side walls.

12. A mechanical stoker comprising an endless traveling chain grate, a draft box surrounded by said grate, the top of said draft box being open to discharge draft through the upper portion of the grate, said draft box having side and bottom walls to confine the draft, the bottom wall being supported by the lower portion of said traveling grate and the lower margin of one of said side walls being provided with a recess above said bottom wall, and a sealing bar loosely mounted on said bottom wall and having its upper edge located in said recess.

13. A mechanical stoker comprising an endless traveling chain grate, a draft box surrounded by said grate, the top of said draft box being open to discharge draft through the upper portion of the grate, said draft box having side and bottom walls to confine the draft, the bottom wall being made of independently yieldable sections contacting with and supported by the lower portion of the traveling grate, and sealing bars loosely mounted on said sections and loosely interlocked with said side walls.

14. A mechanical stoker comprising an endless traveling chain grate, and a draft box surrounded by said grate, said draft box having walls at the sides of said grate and a bottom wall between the first named walls, said bottom wall being in contact with and supported by the lower portion of the traveling grate, and sealing bars loosely supported on said bottom wall and having their upper edges loosely interlocked with the first named walls.

15. A mechanical stoker comprising an endless traveling chain grate, and a draft box surrounded by said grate, said draft box having walls at the sides of said grate and a bottom wall between the first named walls, said bottom wall being in contact with and loosely supported by the lower portion of the traveling grate, and angle bars seated on the side margins of said bottom wall and loosely interlocked with the first named walls.

16. A mechanical stoker comprising an endless traveling chain grate, and a draft box surrounded by said grate, said draft box having walls at the sides of said grate and a bottom wall between the first named walls, said bottom wall being in contact with and supported by the lower portion of said traveling grate, and seals at the side edges of said bottom wall, each of said seals comprising independently yieldable bars loosely mounted on said bottom wall and loosely interlocked with one of the first named walls, and the ends of said bars being adjacent to each other to provide a continuous flexible seal.

17. A mechanical stoker comprising an endless traveling chain grate, a draft box surrounded by said grate, the top of said draft box being open to discharge draft through the upper portion of the grate, said draft box having side and bottom walls to confine the draft, the bottom wall being in contact with and supported by the lower portion of the traveling grate, and seals comprising granular material, heavier than ashes, filling the corners at the junctions of said side and bottom walls.

18. A mechanical stoker comprising an endless traveling chain grate, a draft box surrounded by said grate, the top of said draft box being open to discharge draft through the upper portion of the grate, said draft box having side and bottom walls to confine the draft, the bottom wall being in contact with and supported by the lower portion of the traveling grate, and seals comprising granular material, heavier than ashes, filling the corners at the junctions of said side and bottom walls, said bottom wall having an outlet for the discharge of ashes into the lower portion of the traveling grate.

19. A mechanical stoker comprising an endless traveling chain grate, a draft box surrounded by said grate, the top of said draft box being open to discharge draft through the upper portion of the grate, said draft box having side and bottom walls to confine the draft, the bottom wall being in contact with and supported by the lower portion of the traveling grate and the side walls being spaced from said bottom wall, and seals comprising metallic granules filling the corners formed by said bottom and side walls.

20. A mechanical stoker comprising an endless traveling chain grate, a draft box surrounded by said grate, the top of said draft box being open to discharge draft through the upper portion of the grate and the bottom of said draft box being adapted to discharge granular material into the lower portion of the grate, said bottom comprising bottom members contacting with and supported by the grate, and sealing means for said bottom including sealing members arranged longitudinally of the grate and located directly above the side margins of the lower portion of the grate, said sealing members being loosely supported by said bottom members.

21. A mechanical stoker comprising an endless traveling chain grate, a draft box surrounded by said grate, the top of said draft box being open to discharge draft through the upper portion of the grate and the bottom of said draft box being adapted to discharge granular material into the lower portion of the grate, said bottom comprising bottom members contacting with and supported by the grate, and sealing means for said bottom including sealing bars arranged longitudinally of the grate and located directly above the side margins of the lower portion of the traveling grate, said sealing bars being loosely supported by said bottom members, and means for preventing displacement of said bars.

22. A mechanical stoker comprising an endless traveling chain grate, a draft box surrounded by said grate, the top of said draft box being open to discharge draft through the upper portion of the grate and the bottom of said draft box being adapted to discharge granular material into the lower portion of the grate, and sealing means for said bottom including angle bars arranged longitudinally of the grate and located in the corners immediately above the side margins of the lower portion of the traveling grate, granular sealing material cooperating with said angle bars to form seals at said corners, said angle bars being loosely supported by said bottom, and means for retaining said angle bars in their operative positions.

In testimony that I claim the foregoing I hereunto affix my signature.

WILLIAM M. DUNCAN.